(No Model.)
G. CARLYLE.
BUTTON MACHINE.
No. 520,913.　　　　　　　　　Patented June 5, 1894.
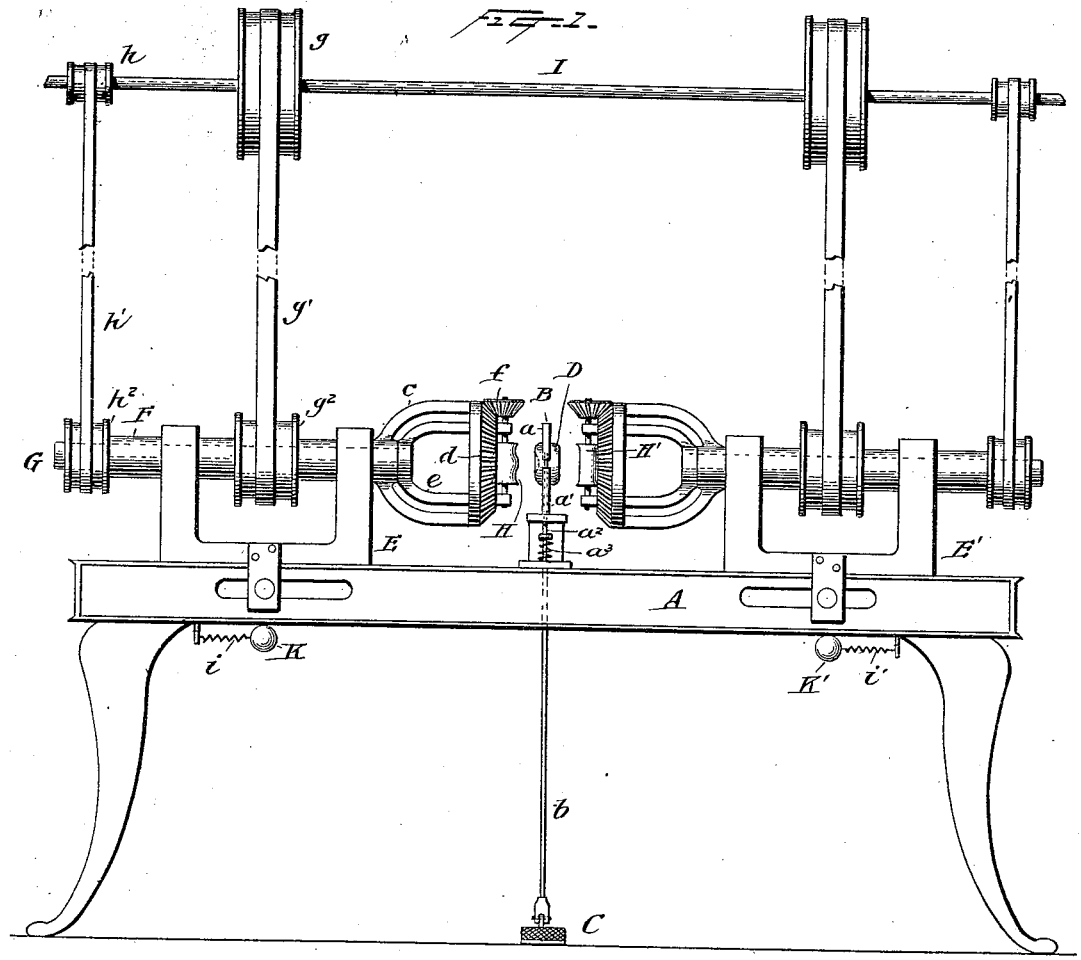
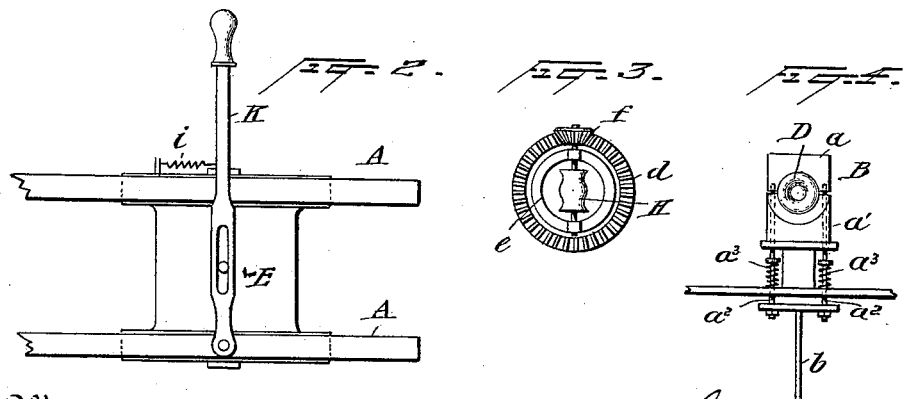
Witnesses
Norris S. Clark
M. F. Oberly
Inventor
George Carlyle
By his Attorneys
Dyer & Seely
THE NATIONAL LITHOGRAPHING COMPANY,
WASHINGTON, D. C.

UNITED STATES PATENT OFFICE.

GEORGE CARLYLE, OF DETROIT, MICHIGAN, ASSIGNOR TO THE STANDARD PEARL BUTTON COMPANY, LIMITED, OF SAME PLACE.

BUTTON-MACHINE.

SPECIFICATION forming part of Letters Patent No. 520,913, dated June 5, 1894.

Application filed February 10, 1892. Serial No. 421,005. (No model.)

*To all whom it may concern:*

Be it known that I, GEORGE CARLYLE, a citizen of the United States, residing at Detroit, in the county of Wayne and State of Michigan, have invented a certain new and useful Improvement in Button-Forming Machines, (Case A,) of which the following is a specification.

In my Patent No. 301,801 is described a machine for forming pearl buttons, in which the button-blank is carried by a rotating chuck and is acted upon by a rotating grinding-wheel, the button-blank and the grinding-wheel rotating in planes perpendicular to each other and being relatively movable toward and away from each other. The grinding wheel rotates at a much greater speed than the chuck, since the grinding action is produced by the rotation of the wheel, and the object of rotating the chuck is to present all portions of the blank in succession to the wheel.

The object of the present invention is to produce a machine for forming pearl buttons by grinding, which will admit of the button-blank being held stationary with respect to rotation. This I accomplish by acting upon the button-blank with a grinding-wheel which has a compound motion, viz., a motion of rotation upon its spindle around a longitudinal axis and a motion of rotation around an axis perpendicular thereto, the rotation of the grinding-wheel on the spindle being at a much higher speed than its rotation about the axis perpendicular thereto. As a means for producing this compound motion an epicyclic gearing or equivalent contrivance can be employed, both elements of the gear being driven by power connections so as to produce a speed of spindle rotation greater than a speed of rotation at right-angles to the spindle.

A further feature of the invention is the simultaneous or successive forming of the face and back of the button without removing it from the chuck, which operation is permitted by the holding of the blank in a stationary holder or chuck made as narrow as the completed button, from which holder the button-blank projects in both directions so that it can be acted upon by grinding-wheels brought to bear upon it simultaneously or successively from opposite sides.

In the accompanying drawings forming part hereof, Figure 1 is a side elevation of a machine embodying my invention. Fig. 2 is a bottom view of a part of the frame, showing a device for moving forward one of the grinding-wheels. Fig. 3 is a face view of the epicyclic gear; and Fig. 4 is a front view of the chuck for holding the button-blank.

In the drawings, A is a suitable frame, upon which is mounted a stationary chuck B composed, for illustration, of two semicircular parts $a$, $a'$, the part $a'$ being supported upon the bed A, and the part $a$ being drawn downwardly upon the part $a'$ by means of rods $a^2$ against the tension of spring $a^3$. The rods $a^2$ are connected with a foot treadle C by means of a connecting rod $b$, so that by pressing down upon the treadle the movable part $a$ of the chuck will be drawn downwardly upon the stationary part $a'$, and a button-blank D can thus be clamped between the two semicircular parts of the chuck and will be held in that position so long as the treadle is depressed. By releasing the treadle the spring $a^3$ will throw the chuck open and release the blank. Upon the frame A is mounted a sliding table E, carrying in suitable bearings a hollow shaft F, having at its inner end a yoke $c$ supporting an annular beveled gear $d$. Within the hollow shaft F is another shaft G, carrying at its inner end and within the yoke $c$ of the shaft F a yoke $e$, the sides of which project through the open center of the beveled gear $d$ and have journaled in their ends the spindle of a grinding-wheel H made of emery or other suitable material. Upon the end of the spindle of the grinding-wheel is a beveled pinion $f$ meshing with the teeth of the beveled gear $d$. A countershaft I is provided with large and small pulleys $g$, $h$ connected by endless belts $g'$, $h'$ with pulleys $g^2$, $h^2$ mounted on the sleeve F and shaft G, respectively. By means of these pulleys and belts, power is transmitted from the countershaft I to the sleeve F and shaft G, the sleeve F rotating with a higher rate of speed than the shaft G. Both belts $g'$, $h'$ may be direct belts, or one may be a cross belt. In the former case both the sleeve F and shaft G will rotate in the same direction; in the latter case they will rotate in opposite directions. The speed of the sleeve F being so much greater than that of the shaft G, the effects produced will be substantially the same in either case. The rotation of the shaft F will cause the annular beveled gear $d$ to rotate, and this will turn the pinion $f$ and rotate the grinding-wheel H upon the spindle. The revolution of the shaft G will cause the yoke $e$ to revolve, thus rotating the grinding-wheel and its spindle upon an axis perpendicular to the spindle. This latter axis also passes through the center of the button-blank. The compound movement thus produced enables any desired shape to be given to the button-blank, whether concave or convex, or a combination of concave and convex, as will be readily understood. To bring the grinding-wheel to bear upon the button-blank, the grinding-wheel and blank must be relatively movable toward and away from each other. This is conveniently accomplished by mounting the table E so as to slide upon the frame A, the table being moved forward by a hand-lever K and retracted by spring $i$. The pulleys are made wide enough to permit of this movement without throwing the belts off.

To form the back of the button upon the same machine there is mounted on the other end of the frame A a sliding table E' moved forward by lever K' and retracted by spring $i'$, which table carries a sleeve and shaft driven from the counter-shaft I and connected by an epicyclic gearing with the grinding wheel H', which has a proper shape for forming the back of the button. The grinding-wheel H' is operated in all respects similar to the grinding-wheel H, having a compound movement of rotation on axes perpendicular to each other. The two grinding wheels may be brought forward against the button-blank simultaneously or successively by the movement of the levers K, K'.

My invention is not limited to the details of construction illustrated and described, except where the same are specifically indicated by the claims, since it is evident that my machine may be modified in many particulars without departing from the spirit of my invention.

What I claim is—

1. In a button forming machine, the combination with a stationary chuck or holder for the button-blank, of a grinding wheel acting upon the blank and having movements of rotation on axes perpendicular to each other, such movements being obtained by separate power connections, substantially as set forth.

2. In a button forming machine, the combination with a narrow blank-holder or chuck from which the blank projects on opposite sides, of grinding-wheels on opposite sides of such chuck for acting on the opposite faces of the button-blank, substantially as set forth.

3. In a button forming machine, the combination with a blank-holder from which the blank projects on opposite sides, of grinding-wheels acting on opposite faces of the blank and having compound movements of rotation, said grinding-wheels having a greater speed of spindle rotation than of rotation at right-angles to the spindles, substantially as set forth.

4. In a button forming machine, the combination with a blank-holder from opposite sides of which the blank projects, of two grinding-wheels acting on opposite faces of the blank and driven by epicyclic gearing, both elements of which are driven by power connections, substantially as set forth.

5. In a button forming machine, a blank-holder or chuck constructed of plates not exceeding in thickness the thickness of the completed button, whereby the blank will project from opposite sides of the holder, substantially as set forth.

This specification signed and witnessed this 2d day of February, 1892.

GEORGE CARLYLE.

Witnesses:
JOHN H. POWELL,
GEORGE MAITLAND.